United States Patent Office 3,185,717
Patented May 25, 1965

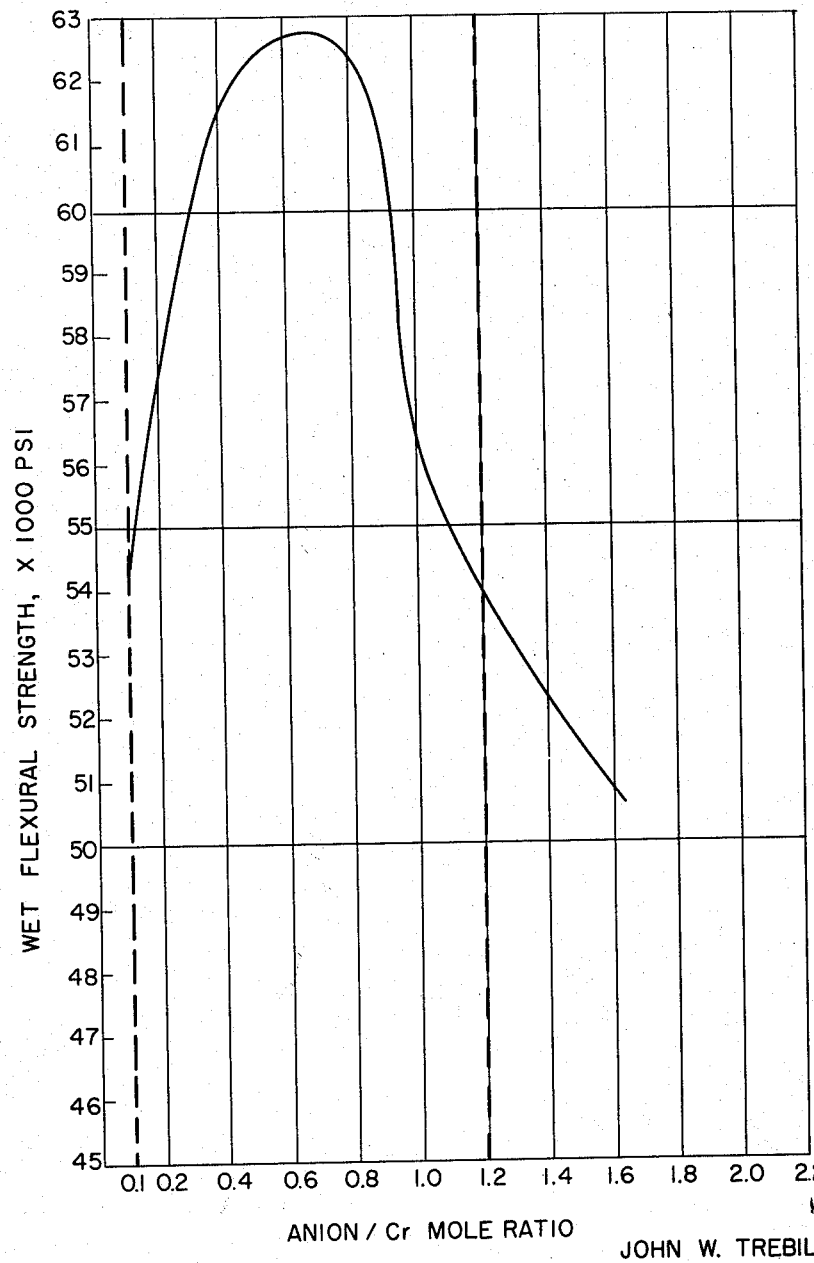

3,185,717
PREPARATION OF WERNER COMPLEXES OF CHROMIUM AND ALKENYL MONOCARBOXYLIC ACIDS
John W. Trebilcock, Wilmington, Del., assignor to E. I. du Pont de Nemours and Company, Wilmington, Del., a corporation of Delaware
Filed Feb. 23, 1962, Ser. No. 175,311
2 Claims. (Cl. 260—438)

This invention relates to a process for preparing a Werner complex of a carboxylic acid and chromium.

Such complexes have heretofore generally been produced in a two-step operation involving (1) reacting a hexavalent chromium compound, such as chromium trioxide, hydrogen chloride and an alcohol to form the corresponding basic chromium salt, followed by (2) reacting the latter salt with a carboxylic acid to form the corresponding Werner chromium complex. Such procedures are fully disclosed for example in Iler U.S. Patent No. 2,273,040 issued February 17, 1942; Iler U.S. Patent No. 2,524,803 issued October 10, 1950; and Goebel and Iler U.S. Patent No. 2,544,666 issued March 13, 1951.

In any event, according to the prior art, it has been believed to be essential in a process for preparing such complex compounds that the proportion of anions, e.g., chlorine atoms, united with the trivalent chromium by primary valence bonds be such as to provide in the resulting complex in excess of about 1.5 chlorine atoms per chromium atom, and more definitely in the range from 1.5 to 3.0.

According to the present invention, it has been found not only (A) that it is possible to carry out the preparation of Werner complexes of the type referred to above in a single step operation to produce a complex having a chloride to chromium ratio of less than 1.5; but also (B) that a surprising improvement is obtained in wet strength of glass fiberplastic laminates when the glass fibers have been treated with a complex prepared according to the present invention wherein the complex has a chloride to chromium ratio within the range from about 0.1:1 to about 1.2:1.

The use of Werner complexes for the treatment of glass fibers which are to be bonded into resins is shown for example in Steinman U.S. Patent No. 2,552,910 issued May 15, 1951, and Steinman U.S. Patent No. 2,611,718 issued September 23, 1952. It is well known that improvement in the wet strength of such bonded articles is a goal long sought in the art.

The unexpected advantage obtained by the use of a complex compound produced according to the present invention is illustrated graphically in the attached drawing which shows a plot of wet flexural strength of a treated glass fiber-resin bonded article on the vertical axis versus the anion, i.e., chloride, to chromium mole ratio of the complex treating material on the horizontal axis. The outstanding wet strength can clearly be seen for ratio values in the indicated range from about 0.1 to 1.2. It will be noted that the wet strength, for some reason, falls off strikingly for ratio values above the indicated range.

According to the present invention, a Werner complex is prepared in a single step process by bringing together a water-soluble chromium compound such as chromium trioxide, hydrochloric acid, an alcohol that is water-soluble to an extent of at least 5% at 20° C. and an unsaturated monocarboxylic acid.

The hydrochloric acid and the chromium compound must be used in amounts that provide from 0.1 to 1.2 chloride atoms per chromium atom in the complex. If the chromium compound is not soluble in the hydrochloric acid, the process should be carried out in the presence of sufficient water to dissolve the chromium compound.

The process can be carried out over a wide range of temperature, including all the way from 0° C. where the reaction rate is uneconomically slow to reflux temperature. Superior results are obtained in a preferred range of about 40° to 78° C.

Of suitable chromium compounds useful in this process, those having hexavalent chromium are generally preferred, while chromium trioxide is highly preferred. The trivalent chromium group is formed by reduction in the presence of the complexing carboxylic acid, as will be readily understood.

The alcohol used in the process of this invention must have a water-solubility of at least 5% at 20° C. Suitable alcohols include lower aliphatic primary and secondary alcohols having this solubility, such as methanol, ethanol, propanol, isopropanol, butanol and 2-butanol. Cyclo-aliphatic alcohols having this solubility, such as cyclohexanol, can be used. Particularly preferred is isopropanol.

It is advantageous to use a substantial excess of the alcohol in this process to act as a solvent for the reactants and the product of the reaction. An excess of the alcohol favors high yields, based on chromium. A minimum excess is about 1.5 mols of alcohol per mol of chromium compound. A large excess of alcohol can be used but is less economical.

In order to obtain the complexes of this invention, it is necessary to have the carboxylic acid present while the hexavalent chromium is reduced to the trivalent state by the alcohol and hydrochloric acid. If the carboxylic acid is not present, for example, if an attempt is made to form the basic chromic chloride first and then to add the carboxylic acid, as taught in the prior art, the basic chromic chloride formed polymerizes, forming some precipitate or gelling the entire solution. The basic chromic chloride formd in the absence of the carboxylic acid does not give a clear solution in water.

In order to obtain a uniform product, it is necessary to add the chromium compound and the hydrochloric acid simultaneously and in the ratio that is desired in the final complex. If, for example, the hydrochloric acid is added to the alcohol and carboxylic acid solution before the chromium compound, the excess chloride will be taken up by the initial chromium, leaving insufficient chloride to complete the reduction of the remaining chloride.

The proportion of carboxylic acid to use in this invention is governed, as will be readily understood from a reading of the Iler patents referred to above, by the number of acido groups which it is desired to have coordinated with the chromium atom. It has been found that a proportion of chromium atoms to acido groups within the range from about 0.6:1 to 10:1 is satisfactory. A ratio of chromium atoms to acido groups of 2:1 is preferred.

The functional acido group of the carboxylic acid can contain a single unsaturated group, as in acrylic acid, or a plurality of such groups, as in sorbic acid. This group of acids includes beta-gamma unsaturated acids, such as vinyl acetate, and gamma-delta unsaturated acids, such as allyl acetic, but of this group the alpha-beta unsaturated acids are especially preferred. Members of this class include, for instance, acrylic acid and substituted acrylic acids such as methacrylic, crotonic, isocrotonic, alpha and beta ethyl acrylic, angelic, and tiglic, and beta furyl acrylic acids, all of which are within the generic term "acrylic acids."

The especially preferred carboxylic acids are methacrylic acid and acrylic acid.

The complexes of this invention are dispersible without precipitation in water and characterized by an extremely low content of chloride anion.

The complexes prepared by the present process are useful in the uses disclosed by, and in place of the prior art complexes of, the patents cited above. In particular, their use in the treatment of glass fibers for bonding into resins effects the remarkable improvement in wet strength as will be clear from the attached drawing and the examples that appear below.

This invention will now be more fully described but is not intended to be limited by the following illustrative examples:

EXAMPLE 1

A chrome complex of methacrylic acid is prepared as follows: 100 parts of chromium trioxide is dissolved in a mixture of 65 parts of water and 76 parts of concentrated hydrochloric acid to give a red solution. This solution is then slowly added to a solution of 43 parts of methacrylic acid in 582 parts of isopropanol in an agitated flask fitted with a condenser. The heat of reaction is very high causing the mixture to reflux at 76° C. The addition takes two hours after which a greenish-blue complex is obtained. The product is analyzed and found to have 6.01% chromium and 3.27% chloride.

A treating solution for applying the chrome complex of methacrylic acid to glass fabric is prepared by adding 40 parts of the chrome complex solution described above to 1960 parts of water with agitation. The pH of this solution is adjusted to a value of 6.2 with a dilute aqueous solution of ammonia.

A sample of heat-cleaned glass fabric, 181 weave (described in U.S. Air Force Specification No. 12051, August 3, 1949), is then immersed in the solution for a period of 5 minutes. The glass fabric is passed through a rubber-rolled hand wringer to remove excess solution and is dried for a period of 10 minutes in an oven at a temperature of 150° C. After the fabric is removed from the oven and allowed to cool, it is suitable for laminate preparation without any additional washing step. A laminate is prepared from the treated glass cloth by impregnating pieces of the cloth with a low pressure polyester resin containing 1% benzoyl peroxide as a curing catalyst. A sandwich containing 12 layers of glass fabric is formed and cured under a pressure of 30 p.s.i. in a heated hydraulic press. The platens of the press are heated at such a rate that they reach a temperature of 60° C. after a period of 30 minutes, 80° C. after 45 minutes and 120° C. after 60 minutes. The laminate is then cooled and removed from the press. The laminate is transparent and has a dry flexural strength, determined according to Federal Specification L-P-406a, of 73,400 p.s.i. After the laminate is boiled for a period of two hours in boiling water, it has a flexural strength of 62,700 p.s.i. These flexural strengths, especially the wet strength, are remarkably stronger than the corresponding strengths of a laminate prepared from glass fabric finished with a solution of a commercially available chrome complex.

EXAMPLE 2

Additional chromium complexes of methacrylic acid are prepared by the process outlined in Example 1, except that the amount of hydrochloric acid is varied to give different chloride to chromium ratios. The analytical values for chromium and chloride, the calculated Cl/Cr mole ratios and the outstanding wet flexural strengths of polyester laminates, prepared as described in Example 1, are shown in Table I. These values are remarkably higher than those obtained using chromium complexes of methacrylic acid prepared by prior art processes.

*Table I*

| Complex analysis | | Cl/Cr, mole ratio | Wet flexural strength, p.s.i. |
|---|---|---|---|
| Percent Cr | Percent Cl | | |
| 5.89 | 0.88 | 0.22 | 57,900 |
| 6.03 | 2.05 | 0.50 | 62,400 |
| 6.01 | 3.27 | 0.75 | 62,700 |
| 5.97 | 4.12 | 1.01 | 56,100 |

EXAMPLE 3

The chrome complex prepared in Example 1 is used to size glass fibers as shown in this following example. A typical size solution is prepared by adding 476 parts of a plasticized polyvinyl acetate based emulsion to 3000 parts of cold water containing an antifoam agent. A dispersion containing 22.4 parts of a size lubricant in 200 parts of cold water is prepared and added to the polyvinyl acetate solution. A solution containing 135 parts of the chrome complex in 4000 parts of water is prepared and is added to the size solution with agitation. Dilute ammonium hydroxide solution is added to the size solution until a pH of 4.5 is obtained. The size solution is now ready to be used to treat glass fibers.

The sizing of freshly prepared borosilicate glass fibers is well known in the glass industry. As the molten glass flows out of the bottom of an electrically heated platinum bushing, it solidifies into fibers. The fibers are cooled with a water spray and are then passed over a circular graphite wheel, over which the size solution is slowly flowing and the size is picked up. After sizing, the fibers are gathered together into a bundle called a strand which is then wound onto a spool at high speeds. After the spool is full, it is removed and dried at elevated temperatures to harden the size. It is readily apparent that the function of the size is to bind the fibers together into a strand to prevent breakage of the fibers as they proceed through further processing. A second function of a size is to produce good performance characteristics for the glass fibers in plastic laminates. Thus, the size must contain a coupling agent which gives good adhesion between the fibers and plastics under both wet and dry conditions. In this example, the coupling agent is the chrome complex.

After the sized glass is dried, a test laminate is prepared as follows: Lengths of the glass strands are cut and folded into a bundle which is soaked with catalyzed polyester resin prepared as shown in Example 1 above. The bundle of glass fibers containing the polyester resin is then placed in a die and cured in an oven until the resin has cured. In this manner laminates containing about 60% glass are formed. The rods are then cut into sections and tested for flexural strength both dry and after 2 hours boiling in water. The laminate formed from the glass sized with the size containing the complex possesses a high wet strength compared to a laminate prepared from glass sized with a size that did not contain the complex.

EXAMPLE 4

A chromium complex of acrylic acid having a chloride anion to chromium ratio of 1:1 is prepared as shown in this example: To a mixture of 30 parts of water and 25 parts of concentrated hydrochloric acid is added 25 grams of chromium trioxide with agitation. When all of the chromium trioxide is dissolved, the solution is slowly added dropwise to a solution of 9 parts of acrylic acid in 236 parts of isopropanol in a round-bottom flask fitted with a condenser. The reaction is very exothermic causing the temperature of the mixture to rise and to reflux at 78° C. When all of the chromium trioxide solution is added, the mixture is allowed to cool to room temperature. The complex is blue-green in color and is soluble in isopropanol.

EXAMPLE 5

To 500 parts of water is added 1 part of the complex prepared in Example 4, giving a solution having a pH of 3.4. To this solution is added 200 parts of finely powdered silica with agitation. The pH at the end of this step is 4.6. A solution of 1% ammonia in water is added to the dispersion of silica in the complex solution until a pH of 6.2 is obtained. The dispersion is stirred for 15 minutes and then filtered to remove the silica. The filtrate is clear indicating that the chrome complex has coated the silica. The filter cake is washed with excess water to remove any soluble matter and is then dried at 125° C. in an air circulation oven. The dried silica is then crushed and passed through a 60 mesh screen to remove lumps.

The treated silica prepared above is used to fill an epoxy potting resin mixture as follows: Metaphenylenediamine at a level of 14 parts per hundred parts of resin is added to an epoxy resin having an epoxide equivalent of 175 and an average molecular weight of 350. One hundred parts of the treated filler is added to 100 parts of the epoxy resin mixture and the composition is compression molded into flat discs. A pressure of 5 tons is used in the mold and the cure is 30 minutes at 300° F.

The discs are exposed for times up to 3 months at a temperature of 130° F. and a relatively humidity of 100% and the electrical resistance is measured daily. The electrical resistance of the discs filled with the treated filler is over $10^{12}$ ohms (the top reading of the scale), compared to an initial resistance of only $10^9$ for discs filled with untreated silica. Upon extended exposure the discs filled with the treated filler maintain the maximum reading while the discs filled with the untreated filler decrease in electrical resistance continuously over the 3-month period.

In a similar experiment in which pieces of the discs are boiled in water for various lengths of time the strength of the discs filled with untreated silica fall off significantly more rapidly than those filled with the treated silica.

As will be readily understood in the art, these examples can readily be repeated in carrying out the process of the present invention, in accordance with the teachings set forth herein, by substituting any of the starting materials for those set forth in these examples for purposes of illustration and not limitation. Similar excellent results are obtained.

This application is a continuation-in-part of my copending application Serial No. 1,949, filed January 12, 1960, now abandoned.

The embodiments of the invention in which an exclusive property or privilege is claimed are:

1. The process for preparing a Werner complex of a carboxylic acid and chromium comprising: simultaneously admixing a water-soluble hexavalent chromium compound and hydrochloric acid with a solution of an alkenyl monocarboxylic acid in an alkanol that is water-soluble to an extent of at least 5% at 20° C., said hydrochloric acid and said chromium compound being used in amounts that provide from 0.1 to 1.2 chloride atoms per chromium atom in said complex.

2. The process of claim 1 wherein the hexavalent chromium compound is chromium oxide and the alkenyl monocarboxylic acid is methacrylic acid.

References Cited by the Examiner
UNITED STATES PATENTS

| | | | |
|---|---|---|---|
| 2,544,666 | 3/51 | Goebel et al. | 260—438 |
| 2,825,659 | 3/58 | Dalton | 260—438 |
| 2,918,483 | 12/59 | Varul | 260—438 |

TOBIAS E. LEVOW, *Primary Examiner.*